United States Patent
Qian et al.

(10) Patent No.: US 11,733,842 B2
(45) Date of Patent: Aug. 22, 2023

(54) ELECTRONIC DEVICE AND CONTROL METHOD THEREOF FOR DETERMINING DISPLAYED CONTENT BASED ON USER PRESENCE AND INTEREST

(71) Applicant: Lenovo (Beijing) Co., Ltd., Beijing (CN)

(72) Inventors: Jia Qian, Beijing (CN); Hang Cai, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/834,993

(22) Filed: Mar. 30, 2020

(65) Prior Publication Data

US 2020/0310629 A1 Oct. 1, 2020

(30) Foreign Application Priority Data

Mar. 31, 2019 (CN) .......................... 201910254540.5

(51) Int. Cl.
*G06F 3/04842* (2022.01)

(52) U.S. Cl.
CPC .............................. *G06F 3/04842* (2013.01)

(58) Field of Classification Search
CPC .... G06F 3/04842; G06F 3/013; G06F 1/3206; G06F 1/3265; H04M 1/72427; H04M 1/72454; Y02D 10/00
See application file for complete search history.

(56) References Cited

U.S. PATENT DOCUMENTS

| | | | |
|---|---|---|---|
| 2010/0205667 A1* | 8/2010 | Anderson | G06F 21/62 726/19 |
| 2015/0070516 A1* | 3/2015 | Shoemake | H04N 21/44008 348/207.11 |
| 2017/0031433 A1* | 2/2017 | Abou Mahmoud | G06F 3/013 |
| 2017/0123744 A1* | 5/2017 | Park | G09G 5/003 |
| 2017/0262154 A1* | 9/2017 | Black | G06F 3/012 |
| 2018/0096507 A1* | 4/2018 | Valdivia | G06F 3/04842 |

FOREIGN PATENT DOCUMENTS

| | | |
|---|---|---|
| CN | 101443849 A | 5/2009 |
| CN | 102385571 A | 3/2012 |
| CN | 103188506 A | 7/2013 |
| CN | 104750254 A | 7/2015 |
| CN | 104809387 A | 7/2015 |
| CN | 105528147 A | 4/2016 |
| CN | 105577947 A | 5/2016 |
| CN | 105809000 A | 7/2016 |
| CN | 108052810 A | 5/2018 |
| CN | 108966015 A | 12/2018 |
| JP | 2010193062 A | 9/2010 |
| JP | 5010666 B2 | 8/2012 |

* cited by examiner

*Primary Examiner* — Stephen G Sherman
(74) *Attorney, Agent, or Firm* — Anova Law Group, PLLC

(57) ABSTRACT

A processing method includes displaying a first content, acquiring input information, and displaying a second content in response to the input information satisfying a condition. The input information satisfying the condition indicates presence of a viewer of interest.

18 Claims, 4 Drawing Sheets

ELECTRONIC DEVICE AND CONTROL METHOD THEREOF FOR DETERMINING DISPLAYED CONTENT BASED ON USER PRESENCE AND INTEREST

CROSS-REFERENCES TO RELATED APPLICATION

This application claims priority to Chinese Patent Application No. 201910254540.5, filed on Mar. 31, 2019, the entire content of which is incorporated herein by reference.

FIELD OF TECHNOLOGY

The present disclosure relates to the field of information processing technology and, more specifically, to an electronic device and a control method.

BACKGROUND

In conventional technology, if an electronic device, such as a mobile phone and a computer, needs to display content, a user generally needs to manually operate the electronic device, or certain specific content can be displayed when the standby time of the electronic device reaches a preset time threshold. However, content cannot be displayed based on actual needs, which reduces the user experience.

BRIEF SUMMARY OF THE DISCLOSURE

In accordance with the disclosure, there is provided a processing method includes displaying a first content, acquiring input information, and displaying a second content in response to the input information satisfying a condition. The input information satisfying the condition indicates presence of a viewer of interest.

Also in accordance with the disclosure, there is provided an electronic device including a display device configured to display a first content, a sensing device configured to acquire input information, and a processing device configured to control the display device to display a second content in response to the input information satisfying a condition. The input information satisfying the condition indicates presence of a viewer of interest.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other drawings in accordance with the accompanying drawings without any creative efforts.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
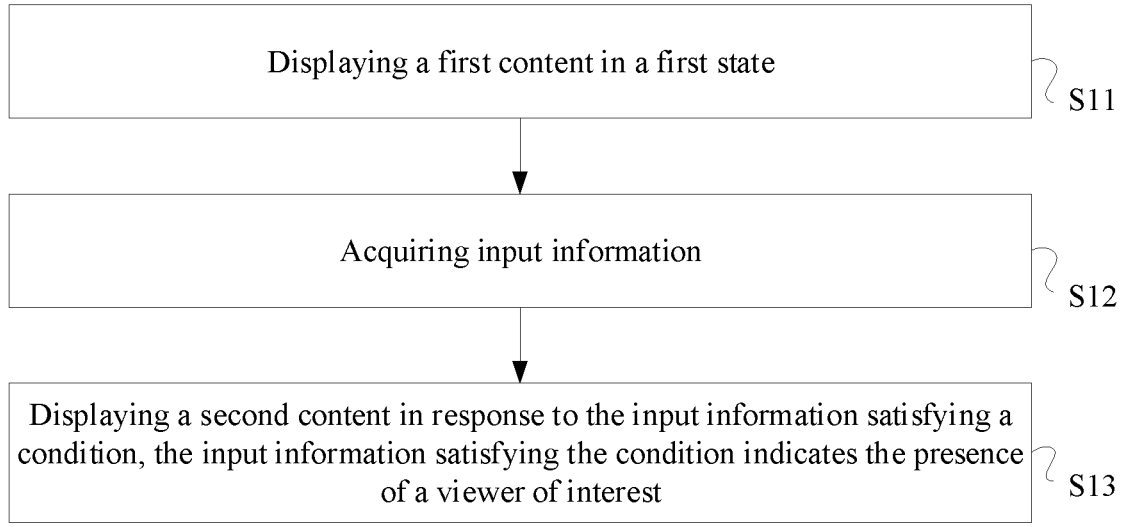
FIG. 1 is a flowchart of an information processing method according to an embodiment of the present disclosure.

FIG. 1 illustrates a processing method according to an embodiment of the present disclosure. The processing method will be described in detail below.

S11, displaying a first content in a first state.

In some embodiments, when the electronic device is in the first state, the first content may be displayed.

In some embodiments, the first state may be an operation state of the electronic device. For example, the electronic device may be in the first state when the electronic device is turned off, or, the electronic device may be in the first state when the electronic device is in a standby state, or, the electronic device may be in the first state when the electronic device is in a normal operation state.

More specifically, when the electronic device is in the first state, the electronic device may display the first content.

In some embodiments, the first state may be a state related to the power consumption of the electronic device. For example, the first state may be a first power state, and a second state may be a second power state. In some embodiments, the power consumption of the electronic device in the first power consumption state may be less than the power consumption of the electronic device in the second power consumption state. In some embodiments, the power consumption of the electronic device in the first power consumption state may be greater than the power consumption of the electronic device in the second power consumption state.

In some embodiments, the first state may be a state related to the accessibility of the electronic device, such as an access-restricted state and an access-unrestricted state.

The first state may be an access-restricted state, or the first state may be an access-unrestricted state. In some embodiments, the first state may be a lock screen state, and the lock screen state may be a state with a screen saver displayed. At this time, the first content may be the displayed screen saver content. In some embodiments, the first state may be a black screen state. At this time, the first content may be no content to display. In some embodiments, the first state may be an unlocked state. As such, the first content may be the content of a display interface displayed on a display screen of the electronic device, for example, a chat page with a friend.

In particular, when the electronic device is in an access-restricted state, the corresponding power consumption may be relatively low, and when the electronic device is in an access-unrestricted state, the corresponding power consumption may be relatively high. Further, the first content displayed by the electronic device may be document information or image information.

S12, acquiring input information.

The input information may be input by a user, or actively acquired by the electronic device.

The input information input by the user may be an input operation performed by the user directly on the electronic device, for example, an unlock operation or a control instruction, or an operation on a physical key.

The input information actively acquired by the electronic device may be an electronic device actively acquiring or detecting environment information. For example, if the electronic device detects a change in the image at a preset area, the electronic device may actively acquire the image or other information at the position and consider the acquired image or other information as the input information. In some embodiments, if a shutdown operation is performed on a first device that exchanges information with the electronic device, and the electronic device detects that the shutdown operation is performed on the first device, the electronic device may acquire information that the shutdown operation is performed on the first device as the input information.

S13, displaying a second content in response to the input information satisfying a condition, where the input information satisfying the condition indicates the presence of a viewer of interest.

In some embodiments, displaying a second content in response to the input information satisfying a condition may include displaying the second content if the information input by the user or actively acquired by the electronic device satisfies the condition.

Certain instructions can be triggered when the input information satisfies the condition, and the instructions can cause the electronic device to display the second content. For example, the input information can cause the electronic device to light up the screen. At this time, the second content can be displayed. In some embodiments, the input information may cause an application or a function of the electronic device to run and display the second content, or the input information may cause the currently application or function to display the second content.

When the input information satisfies the condition, it may indicate that a viewer of interest in present, that is, when the presence of the viewer of interest is determined, instead of displaying the first content, the second content can be displayed. In some embodiments, the first content may continue to be displayed while displaying the second content, and the newly added second content and the first content may be displayed in an overlapping manner or displayed in different regions.

In some embodiments, the electronic device may display first content, and then display second content. The state of the electronic device when displaying the first content and the state of the electronic device when displaying the second content may be the same, that is, both may be in the first state. In some embodiments, the electronic device may be in the first state when the first content is displayed, and the electronic device may be in the second state when the second content is displayed.

More specifically, the electronic device may display the first content in a first power consumption state. When the input information satisfies the condition, the power consumption state can be adjusted such that the electronic device may be in a second power consumption state and display the second content in the second power consumption state. In some embodiments, the electronic device may display the first content in the first power consumption state. When the input information satisfies the condition, the power consumption state may not need to be adjusted and the second content may be directly displayed in the first power consumption state.

In some embodiments, the electronic device may display the first content in the access-restricted state. When the input information satisfies the condition, the access state may be adjusted such that the electronic device may be in the access-unrestricted state and display the second content in the access-unrestricted state. In some embodiments, the electronic device may display the first content in the access-restricted state. When the input information satisfies the condition, the second content may be directly displayed in the access-restricted state without adjusting the access state.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 2:
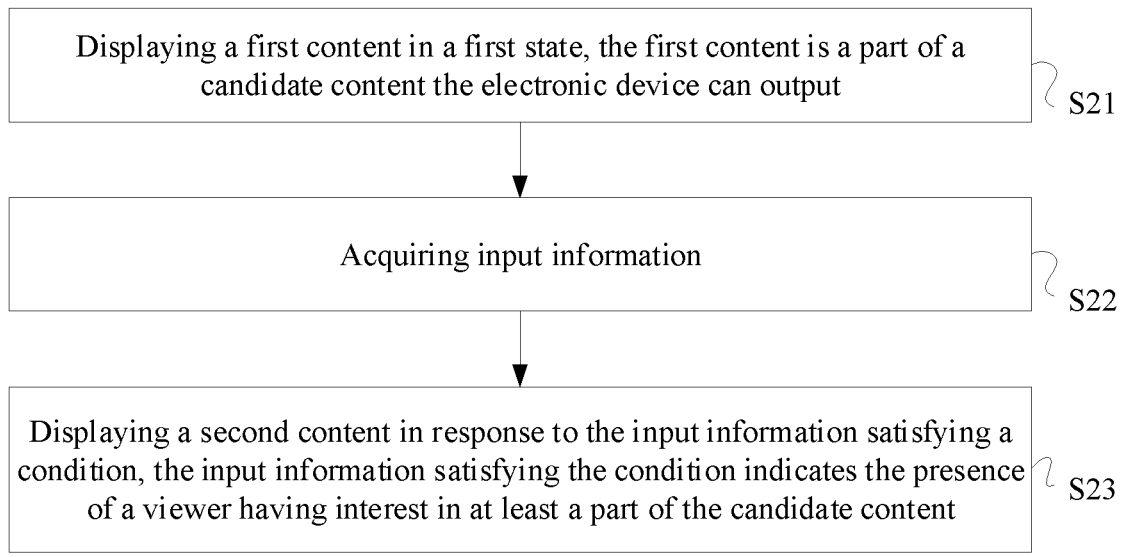
FIG. 2 is a flowchart of the information processing method according to an embodiment of the present disclosure.

FIG. 2 illustrates a processing method according to an embodiment of the present disclosure. The processing method will be described in detail below.

S21, displaying a first content in a first state, the first content is a part of a candidate content that the electronic device can output.

S22, acquiring input information.

S23, displaying a second content in response to the input information satisfying a condition, the input information satisfying the condition indicates the presence of a viewer having interest in at least a part of the candidate content.

The electronic device can output candidate content, and the candidate content can be content stored locally in the electronic device or content stored in a cloud storage. The candidate content to be output by the electronic device in the first state can be set in advance. For example, a landscape or a person's image may be selected as the candidate content for output, or document information may be selected as the candidate content for output.

The first content may be a part of the candidate content that the electronic device can output. The candidate content can be a document or a plurality of documents. The first content may be a part of the candidate content. When the candidate content is a document, the first content may be a part of the document. For example, the candidate content may be a one-page document, and the first content may be the upper third of the document, or the left half of the document, or the important information part of the document. In another example, the candidate content may be an image, and the first content may be the right half of the image, or the focus part of the image. When the candidate content is a plurality of documents, the first content may be one of the plurality of documents, or a part of the plurality of documents including more than one piece of important information. In some embodiments, when the candidate content is a plurality of images, the first content may be one or the plurality of images, or several of the plurality of images may be collectively used as the first content.

If the input information satisfies the condition, it may indicate the presence of a viewer having interest in at least a part of the candidate content, and the second content can be displayed at this time. The viewer pays attention to the first content and the first content is a part of the candidate content. Hence, the viewer's attention may be determined based on the first content, and the second content may be determined based on the attention.

More specifically, if the input information satisfies a condition, the related second content may be determined based on the first content, and the second content may be displayed.

In some embodiments, the second content may be related to the first content. The second content may be a part of the candidate content or the second content may be unrelated to the candidate content and only related to the first content. When the second content is unrelated to the candidate content, it may be needed to find the second content related to the content to be displayed from the local storage of the electronic device, the cloud storage, or the network after determining the input information satisfies the condition.

In some embodiments, determining the viewer's attention based on first content may include determining the content expressed by the first content, and determining the viewer's attention based on the content expressed by the first content. For example, the first content may be a document related to energy. As such, what the first content expresses may be energy-related. Therefore, the viewer's attention may be determined to be energy-related, and the second content may be displayed, where the second content may be an energy-related document, image, or video. In another example, the first content may be an image of a person. As such, what the first content expresses may be a person, the viewer's attention may be determined to be the person, and the second content may be displayed. In some embodiments, the second content may be an image, video, or document related to the person. In some embodiments, the first content may be a landscape image of Zhangjiajie. As such, what the first content expresses may be Zhangjiajie. Therefore, the viewer's attention may be determined to be Zhangjiajie and content related to Zhangjiajie may be displayed.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 3:
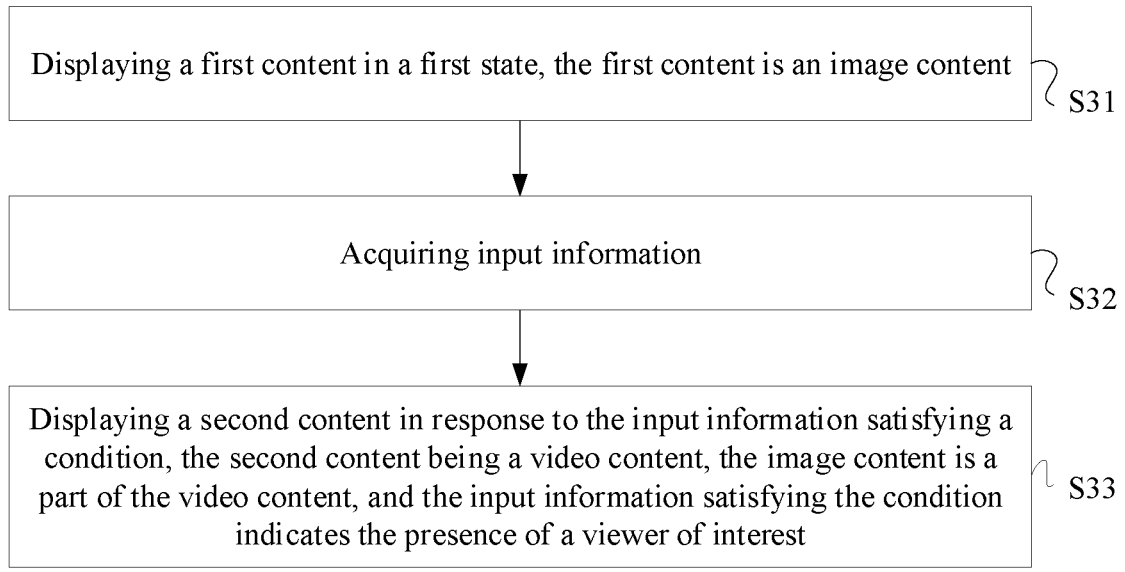
FIG. 3 is a flowchart of the information processing method according to an embodiment of the present disclosure.

FIG. 3 illustrates a processing method according to an embodiment of the present disclosure. The processing method will be described in detail below.

S31, displaying a first content in a first state, the first content is an image content.

S32, acquiring input information.

S33, displaying a second content in response to the input information satisfying a condition and the second content being a video content, the image content is a part of the video content, and the input information satisfying the condition indicates the presence of a viewer of interest.

In some embodiments, while displaying the image information in the first state, when the acquired input information satisfies the condition, the second content may be displayed.

In particular, the second content may be a video content, and the previously displayed image content may be a part of the video content.

The first content may be a frame of image of the video content. In some embodiments, the first content may be an image content of multiple frames, an image content of a combination of multiple frames, or an image content of a single frame, where the image content may be a part of the video content.

When the electronic device is displaying the first content and the input information satisfies the condition, it may indicate that the viewer is interested in the first content. At this time, the related display may be triggered, that is, the video content related to the image content may be displayed. More specifically, the source of the image content can be acquired first, that is, where the image content is acquired from. For example, the image content may be a combined image of multiple frames of images taken from the video content, or a frame of image. As such, the complete video content may be displayed, or a part of the video content related to the image content may be displayed. In some embodiments, the image content may be acquired from a document. As such, the complete document may be displayed, or a part of the document related to the image content may be displayed.

In some embodiments, when the electronic device is displaying the first content and the input information satisfies the condition, the related display may be triggered. In particular, the video content related to the image content may be a complete video or a part of a complete video.

In some embodiments, if the displayed video content related to the image content is a complete video, then the display of the complete video content from the beginning may be directly triggered, or the frame in which the image content is located may be identified from the complete video, and the display of the complete video content may start from the frame in which the image content is located. In some embodiments, a preset number of frames of images before the frame where the image is located and a preset number of frames of images after the frame where the image is located may be displayed.

In some embodiments, if the displayed video content related to the image content is a part of a complete video, then the display of a partial video content of the complete video may be directly triggered. More specifically, the partial video content of the complete video may be a part of the video content where the frame of the image content in the complete video content is the starting frame. In some embodiments, the ending frame of the partial video content may be the ending frame of the complete video content.

When the image content is a part of the video content, different image contents may be associated with the same video content or different video contents, such that when the input information satisfies the condition, the video content(s) may be displayed. In some embodiments, if the electronic device is displaying different image contents and the different image contents are from different video contents, then when the input information satisfies the condition, the electronic device may switch from displaying the image contents of interest to displaying the video contents related to the image contents. If the different image contents are from non-adjacent frames of the same video content, then when the input information satisfies the condition, the electronic device may switch from displaying the image contents of interest to displaying different video clips in the same video content.

In the present embodiment, the image content may be displayed in the first state. Further, if the input information satisfies the condition, the video content may be displayed, where the image content may be a part of the video content and the input information satisfying the condition may indicate the presence of a viewer of interest. That is, when the presence of the viewer of interest of the image content displayed by the electronic device is determined, the image content that the viewer is interested may be switched to the video content related to the image content. That is, the video content of interest may be inferred from the image content being viewed by the viewer, and the video content may be derived from the source of the image content. As such, the viewer may understand the source and background of the image content of interest, thereby improving the user's viewing experience.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 4:
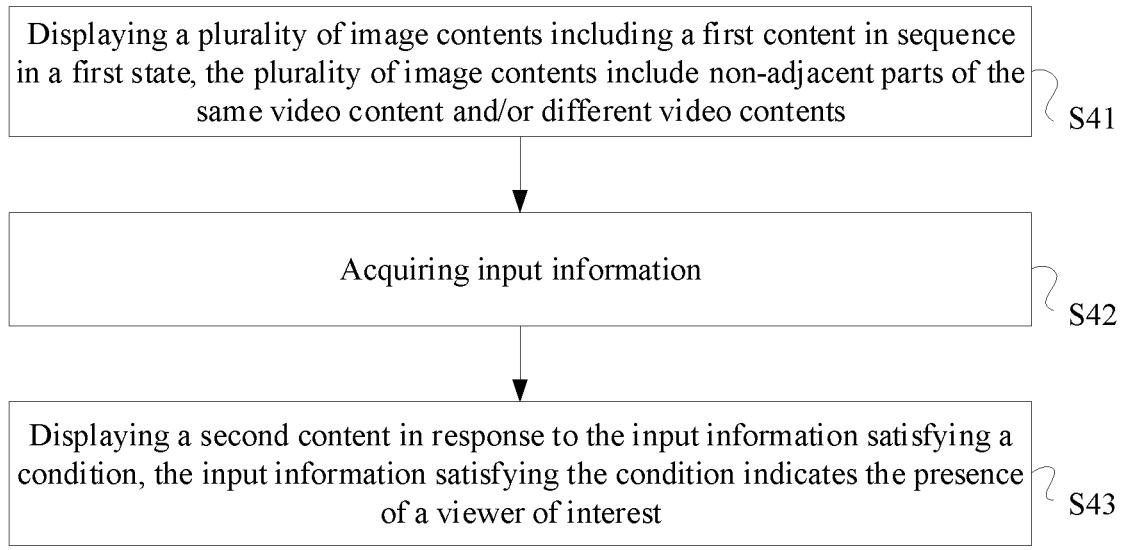
FIG. 4 is a flowchart of the information processing method according to an embodiment of the present disclosure.

FIG. 4 illustrates a processing method according to an embodiment of the present disclosure. The processing method will be described in detail below.

S41, displaying a plurality of image contents including a first content in sequence in a first state, where the plurality of image contents include non-adjacent parts of the same video content and/or different video contents.

In some embodiments, in the first state, the electronic device may display a plurality of image contents in sequence, where the plurality of image contents may be displayed at preset time intervals. After all the image contents are displayed, the plurality of image contents may be displayed again in sequence. When the electronic device is displaying one of the image contents and the input information satisfying the condition is detected, the one of the image contents may be determined to be the first content.

The plurality of image contents may be captured from video content(s). The plurality of image contents may be acquired from the same video content, or separately acquired from different video contents.

In some embodiments, if the plurality of image contents are acquired from the same video content, the acquisition principle may be to acquire a plurality of representative image contents in the video content, or the selected plurality of image contents may include images of different people, scenes, or events in the same video content, respectively. In some embodiments, a frame of image may be acquired from the video content every preset period of time starting from the first frame until the video content has finished playing. Regardless of how the plurality of image contents are acquired from the same video content, the plurality of image contents may be frames that are not adjacent to each other in the video content.

In some embodiments, if the plurality of image contents are acquired from different video contents, any two of the plurality of image contents may be acquired from different video contents. That is, only one image content may be selected for each video content. In some embodiments, for the plurality of image contents, the number of image contents that can be acquired from each video content is not limited. For example, 3 image contents may be selected from the first video, 1 image content may be selected from the second video content, and 5 image contents may be selected from the third video content.

Further, when the electronic device is in the first state, a plurality of image contents may need to be acquired before the plurality of image contents including the first content are displayed. The plurality of image contents may be from the same video content or different video contents. As such, the video content(s) may need to be processed in advance to generate the plurality of image contents.

On one hand, if the plurality of image contents are from the same video content, only one video content may need to be processed. On the other hand, if the plurality of image contents are from different video contents, then all video contents from which the image contents are acquired may need to be processed to generate the plurality of image contents.

In some embodiments, processing the video content may include determining the image content based on the relevance of the image. In the same video content, images with a relevance less than a first threshold may be identified as the image contents. As such, each image content may correspond to a scene, and different image contents may correspond to different scenes. For different video contents, from each video content in the plurality of video contents, an image with a relevance less than a second threshold relative to other video contents may be identified as the image content corresponding to the video content.

Therefore, the image contents corresponding to different video contents may have low relevance to each other and a high degree of difference. As such, the user may determine whether to view the related video content based on the different image contents. In some embodiments, from different video contents, a key image content may be identified in each video content as the image content related to that video content. In particular, the key image content may be the representative image content in the video content and may represent the video content.

More specifically, at least one video content may be processed into a plurality of image contents. The plurality of image contents may include a single frame of image, or a partial video of multiple frames of image. In the first state, the plurality of image contents may be queried and displayed, such that when the electronic device displays the plurality of image contents, a single frame of image may be displayed at a first time, and a partial video of multiple frames of image may be displayed at a second time. Therefore, when a viewer is showing interest to the content displayed by the electronic device, the content of interest may be determined as the first content. Subsequently, the video content related to the first content may be displayed, thereby realizing the effect of switching from a static image to a dynamic video.

In some embodiments, if the processed image contents are all from the same video content, then the video contents related to the plurality of image contents may be different parts of that same video content. For example, the video related to a first image may be a partial video content in the complete video for a first preset duration starting from the frame in which the first image is located in the complete video content. In some embodiments, using the frame where the first image is located in the complete video content as the midpoint, the video related to the first image may include a first partial video content of a second preset duration before the time at which the frame is located and a second partial video content of the second preset duration before the time at which the frame is located. The first partial video content and the second partial video content may be combined to form the video content related to the image content.

S42, acquiring input information.

S43, displaying a second content in response to the input information satisfying a condition, where the input information satisfying the condition indicates the presence of a viewer of interest.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 5:
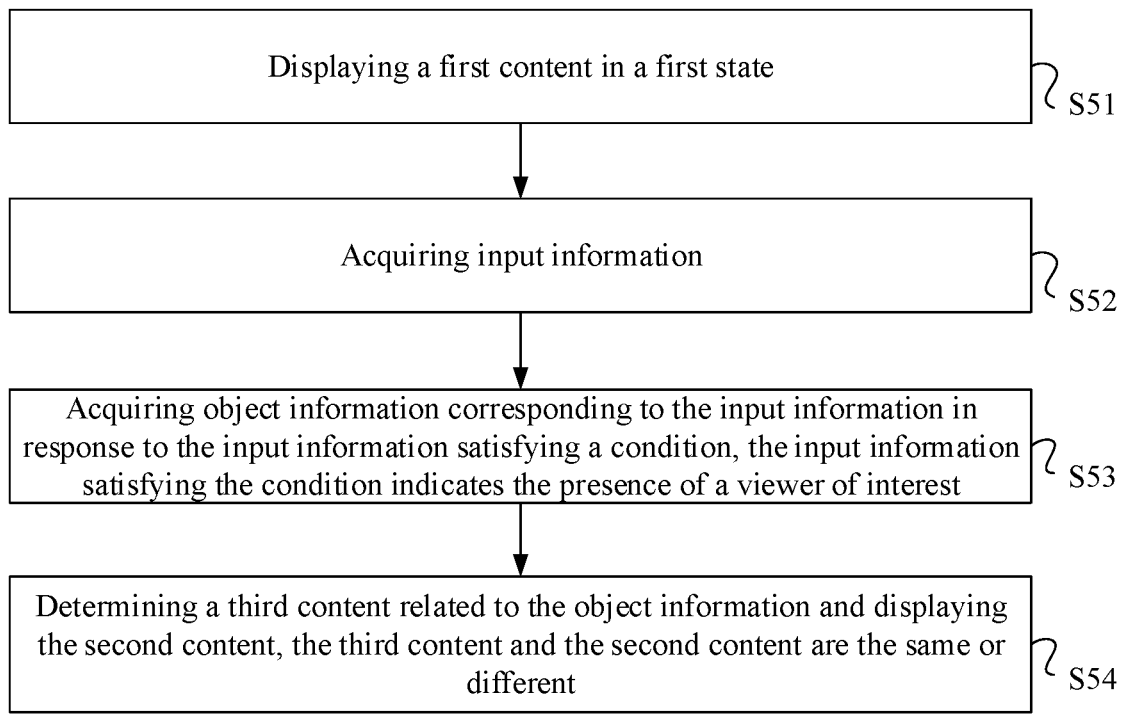
FIG. 5 is a flowchart of the information processing method according to an embodiment of the present disclosure.

FIG. 5 illustrates a processing method according to an embodiment of the present disclosure. The processing method will be described in detail below.

S51, displaying a first content in a first state.

S52, acquiring input information.

S53, acquiring object information corresponding to the input information in response to the input information satisfying a condition, the input information satisfying the condition indicates the presence of a viewer of interest.

S54, determining a third content related to the object information and displaying the second content, the third content and the second content are the same or different.

When the input information is acquired and the input information satisfies the condition, the object information (i.e., the inputting object of the input information) corresponding to the input information may be acquired, and the third content related to the object information may be determined.

In some embodiments, the object information of the input information may be a user or a device.

More specifically, if the object information of the input information is a device, when it is determined that the input information satisfies the condition, the object information corresponding to the input information (i.e., a second device) may be determined and the third content related to the second device may be determined.

In some embodiments, if the object information of the input information is a user, when it is determined that the input information satisfies the condition, the third content related to the user may be determined.

In some embodiments, if the input information is input by the user, the object information of the input information may be considered to be the user.

In some embodiments, if the input information is directed to a user, but not necessarily input by the user, the object information of the input information may still be considered to be the user.

In some embodiments, the third content related to the object information may be determined, and what is displayed is the second content. The third content may be the same as the second content, and the content related to the object information may be displayed.

For example, the electronic device may acquire that a viewer is paying attention to the electronic device, and determine the third content related to the viewer, such as the image, video, or document information of the viewer. Since the third content is the same as the second content, the determined third content related to the viewer may be directly displayed. If the third content is an image of the viewer and a tag that the user added to the image in advance, then when the third content is displayed, the viewer may directly see the image of the viewer and the blessings of the user to the viewer. Therefore, by switching the displayed content of the electronic device, the relationship between the user and the viewer may be strengthened, thereby increasing the favorability of the viewer.

In some embodiments, when the third content is the same as the second content, the second content may be content related to the first content, and the third content may be content related to the viewer. As such, the first content displayed by the electronic device in the first state may be content related to the viewer. In some embodiments, the second content may not be related to the first content, and the second content may be the third content determined after determining the third content related to the viewer.

In some embodiments, the third content related to the object information may be determined, and the second content may be displayed, where the third content may be different from the second content. As such, what is displayed is the second content unrelated to the object information.

For example, the user may set a folder in advance for contents to be displayed by the electronic device in the first state. The folder may include a part of all images or videos stored in the electronic device. When it is determined that the input information satisfies the condition and the third content related to the viewer corresponding to the input information is determined, the third content may be a part of the viewer's images or videos in the folder containing the contents to be displayed in the first state, and the second content may be displayed, where the second content may be different from the third content. In particular, the second content may be content other than the third content in the folder containing contents to be displayed in the first state. That is, other content unrelated to the viewer in the folder may be displayed. As such, the viewing time of information familiar to the viewer may be reduced, thereby increasing the viewer's understanding of other unfamiliar information, and expanding the viewer's knowledge or increasing the understanding of other people.

In some embodiments, the first content may be displayed in the first state. When the input information satisfies the condition, the second content may be displayed. Whether the second content is the same as or different from the third content may be set by the user in advance. For example, it may be set in advance that when the input information satisfies the condition, the second content that is the same as the third content may be displayed. As such, when the input information satisfies the condition, the third content related to the viewer may be directly displayed.

In some embodiments, the displayed content may be determined based on the input information. For example, if the input information satisfies a first condition, the second content that is the same as the third content may be displayed. On the other hand, if the input information satisfies a second condition, the second content that is different from the third content may be displayed.

Further, displaying the second content in response to the input information satisfying the condition may include acquiring an image in response to the input information satisfying the condition. The image may be related to the input information, and identity identification may be performed to the image to determine the object information of the input information. The object information may be matched with the candidate content to determine the third content related to the object information, and display the second content. In some embodiments, the candidate content may correspond to one or more pieces of object information.

In some embodiments, when the object information in the image is an inputting object for inputting the input information, the image of the inputting object may be acquired. That is, an image of a user providing input to the electronic device may be acquired by an image acquisition device for identity identification.

In some embodiments, the identity identification may include determining whether the user has operation right to operate the electronic device, or determining whether the electronic device, network, or cloud storage has information related to the user.

In this technical solution, identity identification may be performed on the object information, and the object information of the input information may be determined. The candidate content may correspond to one or more pieces of object information. If the object information is one of a plurality of pieces of object information in the candidate content, the content corresponding to the object information in the candidate content may be determined, and the content corresponding to the object information may be the content corresponding to the input information.

For example, the object information of the first user may be a, and a relatively large amount of contents may be stored in the candidate content. Each content stored in the candidate content may correspond to one piece of object information, and different contents may correspond to the same object information or different object information. When it is determined that the object information of the first user is a, the content having object information of a in the candidate content may be determined, and the content having object information of a in the candidate content may be determined as the third content, and the content having object information of a may be displayed. In some embodiments, contents not related to the content having object information of a may be displayed.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 6:
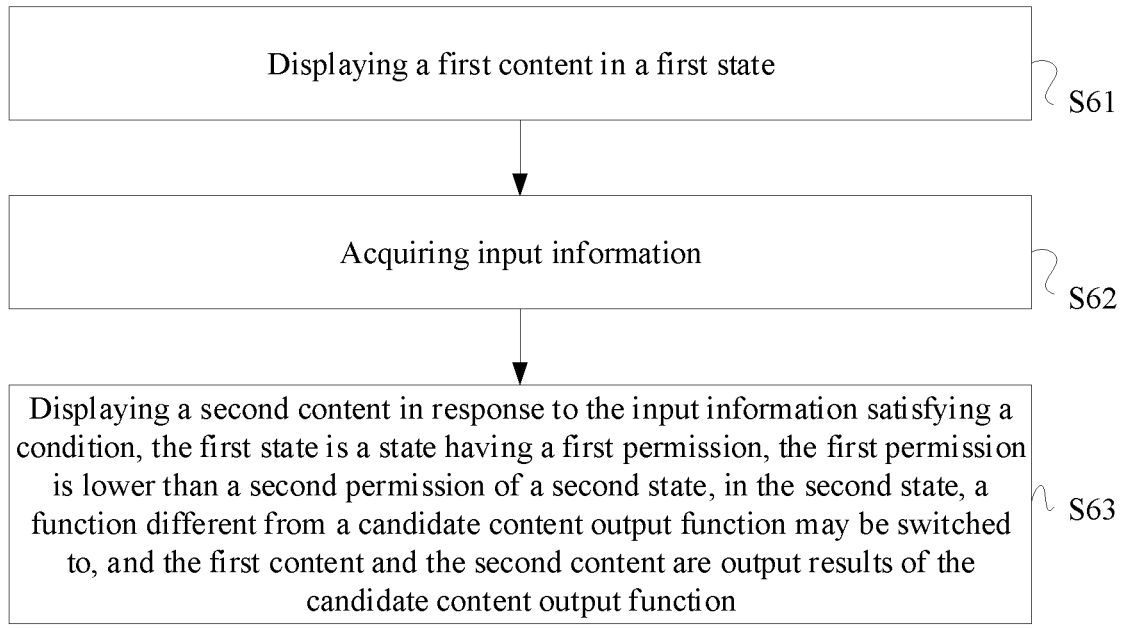
FIG. 6 is a flowchart of the information processing method according to an embodiment of the present disclosure.

FIG. 6 illustrates a processing method according to an embodiment of the present disclosure. The processing method will be described in detail below.

S61, displaying a first content in a first state.

S62, acquiring input information.

S63, displaying a second content in response to the input information satisfying a condition, the first state is a state having a first permission, and the first permission is lower than a second permission of a second state. In the second state, a function different from the candidate content output function may be switched to. In some embodiments, the first content and the second content are output results of the candidate content output function.

In some embodiments, the content output function may be a current application, that is, the application that is constantly running. The candidate content output function may refer to the candidate content set in advance, and the candidate content may be output through the content output function.

In some embodiments, the first content and the second content may be the output results of the candidate content output function, that is, both the first content and the second content may be output by an application that is constantly running. In some embodiments, the first content may be displayed in the first state, that is, in the first state, the content output function may be constantly in the running state.

The electronic device may have at least two states, namely the first state and the second state. In some embodiments, the first state may have a first permission, the second state may have a second permission, and the access permission of the first state may be lower than the access permission of the second state. In the second state, a function different from the candidate content output function can be switched to. That is, the second state may launch other applications such that that other application may also be running, while the first state may only keep running the application that runs at all times.

For example, the second state may be a state in which the electronic device is in a normal operation state, and the first state may be a lock screen state. In the lock screen state, the screen saver in the electronic device may be constantly in the running state, that is, the first content may be the content displayed by the screen saver. When the input information is acquired and the input information satisfies the condition, the second content may also be displayed through the screen saver in the lock screen state when being displayed.

In some embodiments, the first state may also be an operation state of the first device that is exchanging information with the electronic device. When the first device is in the first state, the electronic device may display the first content. For example, when the first device is in a normal operation state, the electronic device may display work-related content; and when the first device is in a standby or shutdown state, the electronic device may display leisure information, etc. In some embodiments, when the first device is in a normal operation state, the electronic device may display the content transmitted by the first device; and when the first device is in a standby or shutdown state, the electronic device may display the content stored in the electronic device.

In some embodiments, the first state may also be a state of a user operating the electronic device. For example, when the user is working, the electronic device may display work-related content; and when the user is not working, the electronic device may display images or videos.

In some embodiments, the first content may be that no content is displayed. In some embodiments, acquiring the input information may include acquiring input used to trigger the content display. Further, displaying the second content in response to the input information satisfying the condition may include using the object information of the viewer acquired before displaying the content to determine the second content and displaying the second content in response to the input information satisfying the condition.

In some embodiments, the first content may be that no content is displayed. As such, the electronic device may be in a black screen state when displaying the first content, that is, the electronic device may be in a state in which no content is displayed.

In the first state, the electronic device may not display content, and acquiring the input information, that is, the input used to trigger the display of the content, that is acquiring the input, where the input may be used to trigger the electronic device to display some contents. More specifically, the input may be an unlock instruction or other instructions for the electronic device to perform other operations, and before performing other operations or during the process of running other operations, the display may need to display content.

In some embodiments, displaying the second content in response to the input information satisfying the condition may include using the object information of the viewer acquired before displaying the content to determine the second content and displaying the second content in response to the input information satisfying the condition.

In some embodiments, the input information satisfying the condition may include the input information satisfying the condition for the display screen of the electronic device to display content. The condition may not require that the input information can be executed, that is, the input information may be an incorrect input instruction, but even if the input information is an incorrect input instruction, as long as the condition for displaying the content on the display screen of the electronic device can be satisfied, the electronic device may display the content.

For example, the input information may be an unlocking instruction entered by a guest, and the guest may not have the unlocking permission. Therefore, the unlocking instruction entered by the guest may not advance the electronic device into the second state.

At this time, the unlocking instruction may not be executed, but the electronic device may enter a guest scene and display the second content, which may be the content displayed by the electronic device in the guest scene.

After it is determined that the input information satisfies the condition, the second content may be displayed. However, before the second state is displayed, the viewer's object information may need to be determined first. In some embodiments, the viewer may be a person entering the input information. More specifically, before the electronic device displays the content, the viewer's image may be acquired through the image acquisition device first to determine the viewer's object information. The object information may be determined by identity identification. Subsequently, the second content may be determined based on the object information, that is, the second content may be content related to the viewer.

For example, if a viewer enters the unlocking information and the unlocking information satisfies the condition for making the display screen of the electronic device to display content, then the viewer's image may be first acquired through the camera to determine the viewer's object information. The object information of the viewer may be a facial feature of the viewer. Based on the facial feature, an image stored in a local database or a cloud databased consistent with the facial feature may be determined and displayed. That is, the second content may be an image of the viewer.

In some embodiments, the input information satisfying the condition may be a trigger condition for the electronic device to display the second content. The trigger condition may include the input information being information used to indicate the movement of the electronic device satisfying a condition, whether an approaching object is present, or whether a viewer is present.

In some embodiments, the movement of the electronic device satisfying a condition may include the direction, amplitude, and/or angle of the movement of the electronic device satisfying the condition. Therefore, the input information satisfying the condition may include the movement of the electronic device satisfying the condition. In some embodiments, the input information satisfying the condition may also include the information that the movement of the electronic device satisfying a first condition is the input information.

If the movement of the electronic device satisfying the condition is the input information satisfying the condition, when in the first state, displaying the first content may include using the candidate content output function to display the first content. That is, the first content may be displayed by the current application that is constantly running. For example, the first state may be a lock screen state and the first content may be displayed in the form of a screen saver, and the input information satisfying the condition may be the movement of the electronic device satisfying the condition. As such, when the electronic device is in the lock screen state, the candidate content may be displayed by using the screen saver. When displaying the candidate content comes to display the first content and the movement of the electronic device satisfies the condition, the second content may be displayed. At this time, the displayed second content may not be related to the input information, that is, the first content may be directly switched to the preset second content. In some embodiments, the displayed second content may be related to the input information. For example, different types of contents may be displayed for different types of movements. That is, the first content may be directly switched to the second content related to the type of movement.

For example, when the electronic device is tilted to the lower left for an angle within a range of 10°-40°, the condition of the movement of the electronic device may be satisfied. That is, the input information satisfies the condition. At this time, the second content may be displayed.

If the movement of the electronic device satisfying a first condition is the input information, the input information may be considered satisfying the condition when the input information satisfies a second condition. At this time, displaying the first content in the first state may include using the candidate content output function to display the first content. That is, the first content may be displayed by the current application that is constantly running. For example, the first state may be a lock screen state and the first content may be displayed in the form of a screen saver. At this time, if the movement of the electronic device satisfies the first condition, and the movement satisfying the first condition satisfies the second condition, the first condition is a movement pattern, the second condition is the movement belonging to a certain range, the movement of the electronic device conforms to the movement pattern, and the movement belongs to a certain range. At this time, the input information may be determined as satisfying the condition, and the second content may be displayed. As such, the second content may be related to the input information, that is, different movements may belong to different ranges, and the corresponding content to be displayed may be different.

For example, when the electronic device is tilted to the lower left for an angle within a range of 10°-40°, the condition of the movement of the electronic device may be satisfied. At this time, the movement process of the electronic device tilting downward to the left of 10°-40° may belong to the first movement type. The first movement type may be preset to be related to the first image type. As such, the second content displayed at this time may be content related to the first image type, that is, the first content may be directly switched to the second content related to the movement type.

When no content is being displayed is the first content and the acquiring input information includes acquiring the input for triggering the content display, the movement of the electronic device satisfying the condition may be used as the input information. At this time, in the first state, the electronic device may not display content, and when the movement of the electronic device satisfies the condition, the second content may be displayed.

For example, when the movement of the electronic device is within the range of 10°-40° toward the lower left, the condition is satisfied, and the second content may be displayed. At this time, the preset content may be directly displayed. That is, the second content may be displayed as long as there is a movement satisfying the condition regardless of the type of the movement, i.e., directly switching from the black screen state to displaying the preset second content. In some embodiments, the type of movement that the movement belongs to may be determined based on the preset information, and display different second contents may be displayed for different types of movements. That is, it may be directly switched from the black screen state to displaying the second content related to the movement type.

In some embodiments, when the electronic device is in the black screen state, and a movement of the electronic device is detected, for example, the electronic device is picked up, and the tilting angle is within a preset range, it is determined that the condition is satisfied, thus the screen of the electronic device may be turned on, and the second content may then be displayed.

In some embodiments, when the electronic device is in the black screen state, and a movement of the electronic device is detected, for example, the electronic device is picked up, at this time, the screen of the electronic device may be turned on. Subsequently, the tilting angle at which the electronic device is picked up may be detected to determine whether the tilting angle is within a certain preset range. If the tilting angle is within the preset range, and second content may be displayed.

In some embodiments, when content is being displayed is the first content and the acquiring input information includes acquiring the input for triggering the content display, the movement of the electronic device satisfying the condition may be used as the input information. At this time, in the first state, the electronic device may display content, and when the movement of the electronic device satisfies the condition, the second content may be displayed. In particular, the second content may be related to the first content, or the second content may not be related to the first content.

For example, candidate content may be displayed in a digital frame in the first state. When a movement of the digital frame is detected, such as when the digital frame is picked up, the first content being displayed when the digital frame is picked up may be determined, and the first content may be a photo. Subsequently, the video content related to the photo may be determined, and the video content may be displayed. That is, when the movement of the electronic device satisfied the condition, the video content related to the first content displayed at the time when the movement satisfies the condition may be triggered to be displayed.

In some embodiments, the input information may be information indicating whether an approaching object is present. That is, information indicating whether an object approaching the electronic device is present. In this case, the input information satisfying the condition may be that when an object is approaching the electronic device, the condition is satisfied. In some embodiments, the input information satisfying the condition may be that when no object is approaching the electronic device, the condition is satisfied.

For example, a distance sensor may be used to determine that a user is approaching the electronic device, and the distance to the electronic device may be less than a third threshold. At this time, the input information satisfies the condition, where the input information may be the detection of an object approaching the electronic device.

In some embodiments, if the first content and the second content are the output results of the candidate content output function, and the first state is related to the first permission, where the first permission may be lower than the second permission of the second state, and the functions other than the candidate content output function may be switched to in the second state. At this time, the first content may be displayed in the first state, and the input information satisfying the condition may be information indicating existence of an approaching object. When an approaching object is detected, the second content may be displayed, where the displayed second content may be content related to the first content displayed at the time when the information indicating existence of the approaching object is detected. In some embodiments, the displayed second content may be content related to the approaching object, or a preset content.

Taking a digital frame as an example. The candidate content may be displayed in the form of a screen saver in the lock screen state. When the information that an object is approaching the digital frame is detected while the digital frame is displaying a first photo, content related to the first photo may be acquired and displayed.

Taking a computer as an example. The candidate content, such as work-related content, may be displayed in a standby state. When the information that an object is approaching the computer is detected, a preset content may be acquired, which may be not work-related.

Taking a mobile phone as an example. The candidate content, such as photos, may be displayed in the form of a screen saver in the lock screen state. When the information that an object is approaching the mobile phone is detected, the identity of the approaching object may be acquired, and photos related to the approaching object, tags, or pre-entered texts for the approaching object may be displayed based on the identity of the approaching object. As such, the interaction between the user and the approaching object may be improved.

In some embodiments, when the first content and the second content are displayed in the form of a screen saver in a permission-restricted state, the input information satisfying the condition may be information indicating there is no approaching object. As such, the second content may be displayed when the input information is information indicating there is no approaching object. When the input information is information indicating there is an approaching object, other contents, such as the first content, may be displayed.

In some embodiments, if no content is being displayed is the first content and the acquired input information satisfies the condition, the second content may be displayed, where the input information satisfying the condition may be information of the presence of an approaching object. As such, when the presence of an approaching object is detected, the black screen state may be switched to a state where the second content is being displayed. In particular, the displayed second content may be content related to the approaching object, or a preset content.

In this case, the electronic device may first switch from the black screen state to a bright screen state, then the second content may be displayed, where in the bright screen state the preset display content may be displayed. In some embodiments, detection may be performed in the black screen state and the second content may be determined, such that the black screen state may be directly switched to a state where the second content is being displayed.

In some embodiments, the input information may be information indicating whether a viewer is present. That is, the presence of a viewer may be determined by using the input information. The input information satisfying the condition may be the presence of a viewer or the absence of a viewer. More specifically, the presence of a viewer may be determined by using face recognition and/or sight recognition.

For example, when a frontal image of a person's face is detected through a camera, it may indicate that a viewer is looking in the direction of the electronic device. As such, the presence of a viewer may be determined.

In some embodiments, the input information may be information indicating whether a viewer is present, and the information may be determined by determining whether a viewer is viewing the electronic device or the first content displayed by the electronic device. The input information satisfying the condition may be the presence of a viewer viewing the electronic device or the first content displayed by the electronic device, or the absence of a viewer viewing the electronic device or the first content displayed by the electronic device. That is, by determining whether there is a viewer of interest. A viewer may be considered to be present if there is a viewer of interest.

For example, if it is determined that a viewer is currently viewing the first content displayed by the electronic device by using a camera, then the input information is satisfying the condition.

In some embodiments, if the input information satisfying the condition is the detection of the information of the presence of a viewer, when the first content and the second content are that the first content is displayed in the form of a screen saver in a permission-restricted state, a viewer is detected, the preset second content may be directly displayed. Or, the identity of the viewer may be determined, and the second content related to the viewer may be displayed based on the identity. Or, when a viewer is detected, the first content that the viewer pays attention to at the time the view is detected may be detected, and the second content related to the first content may be displayed. In some embodiments, when a viewer is detected, the candidate content that the viewer has paid attention to for the longest time may be determined and regarded as the first content. Subsequently, the second content related to the first content may be displayed.

In some embodiments, if the input information satisfying the condition is the detection of the information of the presence of a viewer, and the first content is that no content is being displayed, no content may be displayed in the first state. When a viewer is detected, switch from not displaying content to displaying the preset second content. In some embodiments, switch directly from not displaying content to displaying second content related to the viewer.

In some embodiments, if the input information satisfying the condition is the detection of the information of the presence of a viewer, and the first content is that no content is being displayed, no content may be displayed in the first state. When a viewer is detected, the electronic device may be directly switched from a state in which no content is being displayed to a bright screen state. Subsequently, determine whether the viewer satisfies a preset condition, such as whether the viewer is allowed to access the related content. If it is determined that the viewer satisfies the preset condition, the electronic device may directly switch from the bright screen state to displaying the preset second content. In some embodiments, the electronic device may directly switch from the bright screen state to displaying the second content related to the viewer. If it is determined that the viewer does not satisfy the preset condition, the electronic device may switch from the bright screen state to the state in which no content is being displayed. In some embodiments, after the bright screen state reaches a preset duration, the electronic device may directly switch to the state in which no content is being displayed.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

Figure 7:
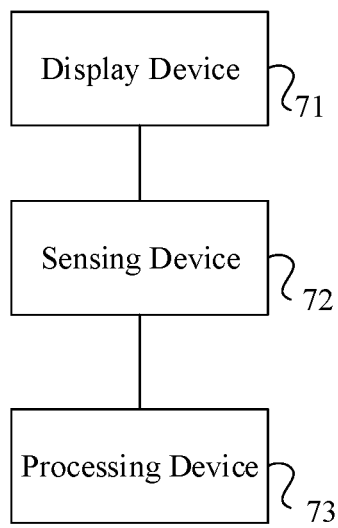
FIG. 7 is a structural diagram of an electronic device according to an embodiment of the present disclosure.

The present disclosure further provide an electronic device. FIG. 7 is a structural diagram of an electronic device according to an embodiment of the present disclosure.

As shown in FIG. 7, the electronic device includes a display device 71, a sensing device 72, and a processing device 73.

In some embodiments, the display device 71 may be configured to display a first content in a first state; the sensing device 72 may be configured to acquire input information; and the processing device 73 may be configured to control the display device 71 to display a second content in response to the input information satisfying a condition, where the input information satisfying the condition indicates the presence of a viewer of interest.

In some embodiments, when the electronic device is in the first state, the first content may be displayed.

In some embodiments, the first state may be an operation state of the electronic device. For example, the electronic device may be in the first state when the electronic device is turned off, or, the electronic device may be in the first state when the electronic device is in a standby state, or, the electronic device may be in the first state when the electronic device is in a normal operation state.

More specifically, when the electronic device is in the first state, the electronic device may display the first content.

In some embodiments, the first state may be a state related to the power consumption of the electronic device. For example, the first state may be a first power state, and a second state may be a second power state. In some embodiments, the power consumption of the electronic device in the first power consumption state may be less than the power consumption of the electronic device in the second power consumption state. In some embodiments, the power consumption of the electronic device in the first power consumption state may be greater than the power consumption of the electronic device in the second power consumption state.

In some embodiments, the first state may be a state related to the accessibility of the electronic device, such as an access-restricted state and an access-unrestricted state.

The first state may be an access-restricted state, or the first state may be an access-unrestricted state. In some embodiments, the first state may be a lock screen state, and the lock screen state may be a state with a screen saver displayed. At this time, the first content may be the displayed screen saver content. In some embodiments, the first state may be a black screen state. At this time, the first content may be no content to display. In some embodiments, the first state may also be an unlocked state. As such, the first content may be the content of a display interface displayed on a display screen of the electronic device, for example, a chat page with a friend.

In particular, when the electronic device is in an access-restricted state, the corresponding power consumption may be relatively low, and when the electronic device is in an access-unrestricted state, the corresponding power consumption may be relatively high. Further, the first content displayed by the electronic device may be document information or image information.

The input information may be input by a user, or actively acquired by the electronic device.

The input information input by the user may be an input operation performed by the user directly on the electronic device, for example, an unlock operation or a control instruction, or an operation on a physical key.

The input information actively acquired by the electronic device may be an electronic device actively acquiring or detecting environment information. For example, if the electronic device detects a change in the image at a preset area, the electronic device may actively acquire the image or other information at the position and consider the acquired image or other information as the input information. In some embodiments, if a shutdown operation is performed on a first device that exchanges information with the electronic device, and the electronic device detects that the shutdown operation is performed on the first device, the electronic device may acquire information that the shutdown operation is performed on the first device as the input information.

In some embodiments, displaying a second content in response to the input information satisfying a condition may include displaying the second content if the information input by the user or actively acquired by the electronic device satisfies the condition.

Certain instructions can be triggered when the input information satisfies the condition, and the instructions can cause the electronic device to display the second content.

For example, the input information can cause the electronic device to light up the screen. At this time, the second content can be displayed. In some embodiments, the input information may cause an application or a function of the electronic device to run and display the second content, or the input information may cause the currently application or function to display the second content.

When the input information satisfies the condition, it may indicate that a viewer of interest in present, that is, when the presence of the viewer of interest is determined, instead of displaying the first content, the second content can be displayed. In some embodiments, the first content may continue to be displayed while displaying the second content, and the newly added second content and the first content may be displayed in an overlapping manner or displayed in different regions.

In some embodiments, the electronic device may display first content, and then display second content. The state of the electronic device when displaying the first content and the state of the electronic device when displaying the second content may be the same, that is, both may be in the first state. In some embodiments, the electronic device may be in the first state when the first content is displayed, and the electronic device may be in the second state when the second content is displayed.

More specifically, the electronic device may display the first content in a first power consumption state. When the input information satisfies the condition, the power consumption state can be adjusted such that the electronic device may be in a second power consumption state and display the second content in the second power consumption state. In some embodiments, the electronic device may display the first content in the first power consumption state. When the input information satisfies the condition, the power consumption state may not need to be adjusted and the second content may be directly displayed in the first power consumption state.

In some embodiments, the electronic device may display the first content in the access-restricted state. When the input information satisfies the condition, the access state may be adjusted such that the electronic device may be in the access-unrestricted state and display the second content in the access-unrestricted state. In some embodiments, the electronic device may display the first content in the access-restricted state. When the input information satisfies the condition, the second content may be directly displayed in the access-restricted state without adjusting the access state.

In some embodiments, the first content may be a part of the candidate content that can be output by the electronic device, and the input information satisfying the condition may indicate that there is a viewer who is at least partially interested in the candidate content.

The electronic device can output candidate content, and the candidate content can be content stored locally in the electronic device or content stored in a cloud storage. The candidate content to be output by the electronic device in the first state can be set in advance. For example, a landscape or a person's image may be selected as the candidate content for output, or document information may be selected as the candidate content for output.

The first content may be a part of the candidate content that the electronic device can output. The candidate content can be a document or a plurality of documents. The first content may be a part of the candidate content. When the candidate content is a document, the first content may be a part of the document. For example, the candidate content may be a one-page document, and the first content may be the upper third of the document, or the left half of the document, or the important information part of the document. In another example, the candidate content may be an image, and the first content may be the right half of the image, or the focus part of the image. When the candidate content is a plurality of documents, the first content may be one of the plurality of documents, or a part of the plurality of documents including more than one piece of important information. In some embodiments, when the candidate content is a plurality of images, the first content may be one or the plurality of images, or several of the plurality of images may be collectively used as the first content.

If the input information satisfies the condition, it may indicate the presence of a viewer having interest in at least a part of the candidate content, and the second content can be displayed at this time. The viewer pays attention to the first content and the first content is a part of the candidate content. Hence, the viewer's attention may be determined based on the first content, and the second content may be determined based on the attention.

More specifically, if the input information satisfies a condition, the related second content may be determined based on the first content, and the second content may be displayed.

In some embodiments, the second content may be related to the first content. The second content may be a part of the candidate content or, the second content may be unrelated to the candidate content and only related to the first content. When the second content is unrelated to the candidate content, it may be needed to find the second content related to the content to be displayed from the local storage of the electronic device, the cloud storage, or the network after determining the input information satisfies the condition.

In some embodiments, determining the viewer's attention based on first content may include determining the content expressed by the first content, and determining the viewer's attention based on the content expressed by the first content. For example, the first content may be a document related to energy. As such, what the first content expresses may be energy-related. Therefore, the viewer's attention may be determined to be energy-related, and the second content may be displayed, where the second content may be an energy-related document, image, or video. In another example, the first content may be an image of a person. As such, what the first content expresses may be a person, the viewer's attention may be determined to be the person, and the second content may be displayed. In particular, the second content may be an image, video, or document related to the person. In some embodiments, the first content may be a landscape image of Zhangjiajie. As such, what the first content expresses may be Zhangjiajie. Therefore, the viewer's attention may be determined to be Zhangjiajie and content related to Zhangjiajie may be displayed.

In some embodiments, the first content may be an image content and the second content may be a video content, where the image content may be a part of the video content.

In some embodiments, while displaying the image information in the first state, when the acquired input information satisfies the condition, the second content may be displayed. In particular, the second content may be a video content, and the previously displayed image content may be a part of the video content.

The first content may be a frame of image of the video content. In some embodiments, the first content may be an image content of multiple frames, an image content of a combination of multiple frames, or an image content of a single frame, where the image content may be a part of the video content.

When the electronic device is displaying the first content and the input information satisfies the condition, it may indicate that the viewer is interested in the first content. At this time, the related display may be triggered, that is, the video content related to the image content may be displayed. More specifically, the source of the image content can be acquired first, that is, where the image content is acquired from. For example, the image content may be a combined image of multiple frames of images taken from the video content, or a frame of image. As such, the complete video content may be displayed, or a part of the video content related to the image content may be displayed. In some embodiments, the image content may be acquired from a document. As such, the complete document may be displayed, or a part of the document related to the image content may be displayed.

In some embodiments, when the electronic device is displaying the first content and the input information satisfies the condition, the related display may be triggered. In particular, the video content related to the image content may be a complete video or a part of a complete video.

In some embodiments, if the displayed video content related to the image content is a complete video, then the display of the complete video content from the beginning may be directly triggered, or the frame in which the image content is located may be identified from the complete video, and the display of the complete video content may start from the frame in which the image content is located. In some embodiments, a preset number of frames of images before the frame where the image is located and a preset number of frames of images after the frame where the image is located may be displayed.

In some embodiments, if the displayed video content related to the image content is a part of a complete video, then the display of a partial video content of the complete video may be directly triggered. More specifically, the partial video content of the complete video may be a part of the video content where the frame of the image content in the complete video content is the starting frame. In some embodiments, the ending frame of the partial video content may be the ending frame of the complete video content.

When the image content is a part of the video content, different image contents may be associated with the same video content or different video contents, such that when the input information satisfies the condition, the video content(s) may be displayed. In some embodiments, if the electronic device is displaying different image contents and the different image contents are from different video contents, then when the input information satisfies the condition, the electronic device may switch from displaying the image contents of interest to displaying the video contents related to the image contents. If the different image contents are from non-adjacent frames of the same video content, then when the input information satisfies the condition, the electronic device may switch from displaying the image contents of interest to displaying different video clips in the same video content.

In the present embodiment, the image content may be displayed in the first state. Further, if the input information satisfies the condition, the video content may be displayed, where the image content may be a part of the video content and the input information satisfying the condition may indicate the presence of a viewer of interest. That is, when the presence of the viewer of interest of the image content displayed by the electronic device is determined, the image content that the viewer is interested may be switched to the video content related to the image content. That is, the video content of interest may be inferred from the image content being viewed by the viewer, and the video content may be derived from the source of the image content. As such, the viewer may understand the source and background of the image content of interest, thereby improving the user's viewing experience.

In some embodiments, displaying the first content in the first state may include displaying a plurality of image contents including a first content in sequence in a first state, where the plurality of image contents includes non-adjacent parts of the same video content and/or different video contents.

In some embodiments, in the first state, the electronic device may display a plurality of image contents in sequence, where the plurality of image contents may be displayed at preset time intervals. After all the image contents are displayed, the plurality of image contents may be displayed again in sequence. When the electronic device is displaying one of the image contents and the input information satisfying the condition is detected, the one of the image contents may be determined to be the first content.

The plurality of image contents may be captured from video content(s). The plurality of image contents may be acquired from the same video content, or separately acquired from different video contents.

In some embodiments, if the plurality of image contents are acquired from the same video content, the acquisition principle may be to acquire a plurality of representative image contents in the video content, or the selected plurality of image contents may include images of different people, scenes, or events in the same video content, respectively. In some embodiments, a frame of image may be acquired from the video content every preset period of time starting from the first frame until the video content has finished playing. Regardless of how the plurality of image contents are acquired from the same video content, the plurality of image contents may be frames that are not adjacent to each other in the video content.

In some embodiments, if the plurality of image contents are acquired from different video contents, any two of the plurality of image contents may be acquired from different video contents. That is, only one image content may be selected for each video content. In some embodiments, for the plurality of image contents, the number of image contents that can be acquired from each video content is not limited. For example, 3 image contents may be selected from the first video, 1 image content may be selected from the second video content, and 5 image contents may be selected from the third video content.

Further, when the electronic device is in the first state, a plurality of image contents may need to be acquired before the plurality of image contents including the first content are. The plurality of image contents may be from the same video content or different video contents. As such, the video content(s) may need to be processed in advance to generate the plurality of image contents.

On one hand, if the plurality of image contents are from the same video content, only one video content may need to be processed. On the other hand, if the plurality of image contents are from different video contents, then all video contents from which the image contents are acquired may need to be processed to generate the plurality of image contents.

In some embodiments, processing the video content may include determining the image content based on the relevance of the image. In the same video content, images with a relevance less than a first threshold may be identified as the image contents. As such, each image content may correspond to a scene, and different image contents may correspond to different scenes. For different video contents, from each video content in the plurality of video contents, an image with a relevance less than a second threshold relative to other video contents may be identified as the image content corresponding to the video content. Therefore, the image contents corresponding to different video contents may have low relevance to each other and a high degree of difference. As such, the user may determine whether to view the related video content based on the different image contents. In some embodiments, from different video contents, a key image content may be identified in each video content as the image content related to that video content. In particular, the key image content may be the representative image content in the video content and may represent the video content.

More specifically, at least one video content may be processed into a plurality of image contents. The plurality of image contents may include a single frame of image, or a partial video of multiple frames of image. In the first state, the plurality of image contents may be queried and displayed, such that when the electronic device displays the plurality of image contents, a single frame of image may be displayed at a first time, and a partial video of multiple frames of image may be displayed at a second time. Therefore, when a viewer is showing interest to the content displayed by the electronic device, the content of interest may be determined as the first content. Subsequently, the video content related to the first content may be displayed, thereby realizing the effect of switching from a static image to a dynamic video.

In some embodiments, if the processed image contents are all from the same video content, then the video content related to the plurality of image contents may be different parts of that same video content. For example, the video related to a first image may be a partial video content in the complete video for a first preset duration starting from the frame in which the first image is located in the complete video content. In some embodiments, using the frame where the first image is located in the complete video content as the midpoint, the video related to the first image may include a first partial video content of a second preset duration before the time at which the frame is located and a second partial video content of the second preset duration before the time at which the frame is located. The first partial video content and the second partial video content may be combined to form the video content related to the image content.

In some embodiments, displaying the second content in response to the input information satisfying the condition may include acquiring object information corresponding to the input information in response to the input information satisfying a condition, determining a third content related to the object information, and displaying the second content, where the third content and the second content are the same or different.

When the input information is acquired and the input information satisfies the condition, the object information (i.e., the inputting object of the input information) corresponding to the input information may be acquired, and the third content related to the object information may be determined.

In some embodiments, the object information of the input information may be a user or a device.

More specifically, if the object information of the input information is a device, when it is determined that the input information satisfies the condition, the object information corresponding to the input information (i.e., a second device) may be determined and the third content related to the second device may be determined.

In some embodiments, if the object information of the input information is a user, when it is determined that the input information satisfies the condition, the third content related to the user may be determined.

In some embodiments, if the input information is input by the user, the object information of the input information may be considered to be the user.

In some embodiments, if the input information is directed to a user, but not necessarily input by the user, the object information of the input information may still be considered to be the user.

In some embodiments, the third content related to the object information may be determined, and what is displayed is the second content. The third content may be the same as the second content, and the content related to the object information may be displayed.

For example, the electronic device may acquire that a viewer is paying attention to the electronic device, and determine the third content related to the viewer, such as the image, video, or document information of the viewer. Since the third content is the same as the second content, the determined third content related to the viewer may be directly displayed. If the third content is an image of the viewer and a tag that the user added to the image in advance, then when the third content is displayed, the viewer may directly see the image of the viewer and the blessings of the user to the viewer. Therefore, by switching the displayed content of the electronic device, the relationship between the user and the viewer may be strengthened, thereby increasing the favorability of the viewer.

In some embodiments, when the third content is the same as the second content, the second content may be content related to the first content, and the third content may be content related to the viewer. As such, the first content displayed by the electronic device in the first state may be content related to the viewer. In some embodiments, the second content may not be related to the first content, and the second content may be the third content determined after determining the third content related to the viewer.

In some embodiments, the third content related to the object information may be determined, and the second content may be displayed, where the third content may be different from the second content. As such, what is displayed is the second content unrelated to the object information.

For example, the user may set a folder in advance for contents to be displayed by the electronic device in the first state. The folder may include a part of all images or videos stored in the electronic device. When it is determined that the input information satisfies the condition and the third content related to the viewer corresponding to the input information is determined, the third content may be a part of the viewer's images or videos in the folder containing the contents to be displayed in the first state, and the second content may be displayed, where the second content may be different from the third content. In particular, the second content may be content other than the third content in the folder containing contents to be displayed in the first state. That is, other content unrelated to the viewer in the folder may be displayed. As such, the viewing time of information familiar to the viewer may be reduced, thereby increasing the viewer's understanding of other unfamiliar information, and expanding the viewer's knowledge or increasing the understanding of other people.

In some embodiments, the first content may be displayed in the first state. When the input information satisfies the condition, the second content may be displayed.

Whether the second content is the same as or different from the third content may be set by the user in advance. For example, it may be set in advance that when the input information satisfies the condition, the second content that is the same as the third content may be displayed. As such, when the input information satisfies the condition, the third content related to the viewer may be directly displayed.

In some embodiments, the displayed content may be determined based on the input information. For example, if the input information satisfies a first condition, the second content that is the same as the third content may be displayed. On the other hand, if the input information satisfies a second condition, the second content that is different from the third content may be displayed.

Further, displaying the second content in response to the input information satisfying the condition may include acquiring an image in response to the input information satisfying the condition. The image may be related to the input information, and identity identification may be performed to the image to determine the object information of the input information. The object information may be matched with the candidate content to determine the third content related to the object information, and display the second content. In some embodiments, the candidate content may correspond to one or more pieces of object information.

In some embodiments, when the object information in the image is an inputting object for inputting the input information, the image of the inputting object may be acquired. That is, an image of a user providing input to the electronic device may be acquired by an image acquisition device for identity identification.

In some embodiments, the identity identification may include determining whether the user has operation right to operate the electronic device, or determining whether the electronic device, network, or cloud storage has information related to the user.

In this technical solution, identity identification may be performed on the object information, and the object information of the input information may be determined. The candidate content may correspond to one or more pieces of object information. If the object information is one of a plurality of pieces of object information in the candidate content, the content corresponding to the object information in the candidate content may be determined, and the content corresponding to the object information may be the content corresponding to the input information.

For example, the object information of the first user may be a, and a relatively large amount of contents may be stored in the candidate content. Each content stored in the candidate content may correspond to one piece of object information, and different contents may correspond to the same object information or different object information. When it is determined that the object information of the first user is a, the content having object information of a in the candidate content may be determined, and the content having object information of a in the candidate content may be determined as the third content, and the content having object information of a may be displayed. In some embodiments, contents not related to the content having object information of a may be displayed.

In some embodiments, the first state may be a state having a first permission, and the first permission may be lower than a second permission of a second state. In the second state, a function different from the candidate content output function may be switched to. In some embodiments, the first content and the second content are output results of the candidate content output function.

In some embodiments, the content output function may be a current application, that is, the application that is constantly running. The candidate content output function may refer to the candidate content set in advance, and the candidate content may be output through the content output function.

In some embodiments, the first content and the second content may be the output results of the candidate content output function, that is, both the first content and the second content may be output by an application that is constantly running. In some embodiments, the first content may be displayed in the first state, that is, in the first state, the content output function may be constantly in the running state.

The electronic device may have at least two states, namely the first state and the second state. In some embodiments, the first state may have a first permission, the second state may have a second permission, and the access permission of the first state may be lower than the access permission of the second state. In the second state, a function different from the candidate content output function can be switched to. That is, the second state may launch other applications such that that other application may also be running, while the first state may only keep running the application that runs at all times.

For example, the second state may be a state in which the electronic device is in a normal operation state, and the first state may be a lock screen state. In the lock screen state, the screen saver in the electronic device may be constantly in the running state, that is, the first content may be the content displayed by the screen saver. When the input information is acquired and the input information satisfies the condition, the second content may also be displayed through the screen saver in the lock screen state when being displayed.

In some embodiments, the first state may also be an operation state of the first device that is exchanging information with the electronic device. When the first device is in the first state, the electronic device may display the first content. For example, when the first device is in a normal operation state, the electronic device may display work-related content; and when the first device is in a standby or shutdown state, the electronic device may display leisure information, etc. In some embodiments, when the first device is in a normal operation state, the electronic device may display the content transmitted by the first device; and when the first device is in a standby or shutdown state, the electronic device may display the content stored in the electronic device.

In some embodiments, the first state may also be a state of a user operating the electronic device. For example, when the user is working, the electronic device may display work-related content; and when the user is not working, the electronic device may display image or videos.

In some embodiments, the first content may be that no content is displayed. In some embodiments, acquiring the input information may include acquiring input used to trigger the content display. Further, displaying the second content in response to the input information satisfying the condition may include using the object information of the viewer acquired before displaying the content to determine the second content and displaying the second content in response to the input information satisfying the condition.

In some embodiments, the first content may be that no content is displayed. As such, the electronic device may be in a black screen state when displaying the first content, that is, the electronic device may be in a state in which no content is displayed.

In the first state, the electronic device may not display content, and acquiring the input information, that is, the input used to trigger the display of the content, that is acquiring the input, where the input may be used to trigger the electronic device to display some contents. More specifically, the input may be an unlock instruction or other instructions for the electronic device to perform other operations, and before performing other operations or during the process of running other operations, the display may need to display content.

In some embodiments, displaying the second content in response to the input information satisfying the condition may include using the object information of the viewer acquired before displaying the content to determine the second content and displaying the second content in response to the input information satisfying the condition.

In some embodiments, the input information satisfying the condition may include the input information satisfying the condition for the display screen of the electronic device to display content. The condition may not require that the input information can be executed, that is, the input information may be an incorrect input instruction, but even if the input information is an incorrect input instruction, as long as the condition for displaying the content on the display screen of the electronic device can be satisfied, the electronic device may display the content.

For example, the input information may be an unlocking instruction entered by a guest, and the guest may not have the unlocking permission. Therefore, the unlocking instruction entered by the guest may not advance the electronic device into the second state. At this time, the unlocking instruction may not be executed, but the electronic device may enter a guest scene and display the second state, which may be the content displayed by the electronic device in the guest scene.

After it is determined that the input information satisfies the condition, the second content may be displayed. However, before the second state is displayed, the viewer's object information may need to be determined first. In some embodiments, the viewer may be a person entering the input information. More specifically, before the electronic device displays the content, the viewer's image may be acquired through the image acquisition device first to determine the viewer's object information. The object information may be determined by identity identification. Subsequently, the second content may be determined based on the object information, that is, the second content may be content related to the viewer.

For example, if a viewer enters the unlocking information and the unlocking information satisfies the condition for making the display screen of the electronic device to display content, then the viewer's image may be first acquired through the camera to determine the viewer's object information. The object information of the viewer may be a facial feature of the viewer. Based on the facial feature, an image stored in a local database or a cloud databased consistent with the facial feature may be determined and displayed. That is, the second content may be an image of the viewer.

In some embodiments, the input information satisfying the condition may be a trigger condition for the electronic device to display the second content. The trigger condition may include the input information being information used to indicate the movement of the electronic device satisfying a condition, whether an approaching object is present, or whether a viewer is present.

In some embodiments, the movement of the electronic device satisfying a condition may include the direction, amplitude, and/or angle of the movement of the electronic device satisfying the condition. Therefore, the input information satisfying the condition may include the movement of the electronic device satisfying the condition. In some embodiments, the input information satisfying the condition may also include the information that the movement of the electronic device satisfying a first condition is the input information.

If the movement of the electronic device satisfying the condition is the input information satisfying the condition, when in the first state, displaying the first content may include using the candidate content output function to display the first content. That is, the first content may be displayed by the current application that is constantly running. For example, the first state may be a lock screen state and the first content may be displayed in the form of a screen saver, and the input information satisfying the condition may be the movement of the electronic device satisfying the condition. As such, when the electronic device is in the lock screen state, the candidate content may be displayed by using the screen saver. When displaying the candidate content comes to display the first content and the movement of the electronic device satisfies the condition, the second content may be displayed. At this time, the displayed second content may not be related to the input information, that is, the first content may be directly switched to the preset second content. In some embodiments, the displayed second content may be related to the input information. For example, different types of contents may be displayed for different types of movements. That is, the first content may be directly switched to the second content related to the type of movement.

For example, when the electronic device is tilted to the lower left for an angle within a range of 10°-40°, the condition of the movement of the electronic device may be satisfied. That is, the input information satisfies the condition. At this time, the second content may be displayed.

If the movement of the electronic device satisfying a first condition is the input information, the input information may be considered satisfying the condition when the input information satisfies a second condition. At this time, displaying the first content in the first state may include using the candidate content output function to display the first content. That is, the first content may be displayed by the current application that is constantly running. For example, the first state may be a lock screen state and the first content may be displayed in the form of a screen saver. At this time, if the movement of the electronic device satisfies the first condition, and the movement satisfying the first condition satisfies the second condition, the first condition is a movement pattern, the second condition is the movement belonging to a certain range, the movement of the electronic device conforms to the movement pattern, and the movement belongs to a certain range. At this time, the input information may be determined as satisfying the condition, and the second content may be displayed. As such, the second content may be related to the input information, that is, different movements may belong to different ranges, and the corresponding content to be displayed may be different.

For example, when the electronic device is tilted to the lower left for an angle within a range of 10°-40°, the condition of the movement of the electronic device may be satisfied. At this time, the movement process of the electronic device tilting downward to the left of 10°-40° may belong to the first movement type. The first movement type may be preset to be related to the first image type. As such, the second content displayed at this time may be content related to the first image type, that is, the first content may be directly switched to the second content related to the movement type.

When no content is being displayed is the first content and the acquiring input information includes acquiring the input for triggering the content display, the movement of the electronic device satisfying the condition may be used as the input information. At this time, in the first state, the electronic device may not display content, and when the movement of the electronic device satisfies the condition, the second content may be displayed.

For example, when the movement of the electronic device is within the range of 10°-40° toward the lower left, the condition is satisfied, and the second content may be displayed. At this time, the preset content may be directly displayed. That is, the second content may be displayed as long as there is a movement satisfying the condition regardless of the type of the movement, i.e., directly switching from the black screen state to displaying the preset second content. In some embodiments, the type of movement that the movement belongs to may be determined based on the preset information, and display different second contents may be displayed for different types of movements. That is, it may be directly switched from the black screen state to displaying the second content related to the movement type.

In some embodiments, when the electronic device is in the black screen state, and a movement of the electronic device is detected, for example, the electronic device is picked up, and the tilting angle is within a preset range, it is determined that the condition is satisfied, thus the screen of the electronic device may be turned on, and the second content may then be displayed.

In some embodiments, when the electronic device is in the black screen state, and a movement of the electronic device is detected, for example, the electronic device is picked up, at this time, the screen of the electronic device may be turned on. Subsequently, the tilting angle at which the electronic device is picked up may be detected to determine whether the tilting angle is within a certain preset range. If the tilting angle is within the preset range, and second content may be displayed.

In some embodiments, when content is being displayed is the first content and the acquiring input information includes acquiring the input for triggering the content display, the movement of the electronic device satisfying the condition may be used as the input information. At this time, in the first state, the electronic device may display content, and when the movement of the electronic device satisfies the condition, the second content may be displayed. In particular, the second content may be related to the first content, or the second content may not be related to the first content.

For example, candidate content may be displayed in a digital frame in the first state. When a movement of the digital frame is detected, such as when the digital frame is picked up, the first content being displayed when the digital frame is picked up may be determined, and the first content may be a photo. Subsequently, the video content related to the photo may be determined, and the video content may be displayed. That is, when the movement of the electronic device satisfied the condition, the video content related to the first content displayed at the time when the movement satisfies the condition may be triggered to be displayed.

In some embodiments, the input information may be information indicating whether an approaching object is present. That is, information indicating whether an object approaching the electronic device is present. In this case, the input information satisfying the condition may be that when an object is approaching the electronic device, the condition is satisfied. In some embodiments, the input information satisfying the condition may be that when no object is approaching the electronic device, the condition is satisfied.

For example, a distance sensor may be used to determine that a user is approaching the electronic device, and the distance to the electronic device may be less than a third threshold. At this time, the input information satisfies the condition, where the input information may be the detection of an object approaching the electronic device.

In some embodiments, if the first content and the second content are the output results of the candidate content output function, and the first state is related to the first permission, where the first permission may be lower than the second permission of the second state, and the functions other than the candidate content output function may be switched to in the second state. At this time, the first content may be displayed in the first state, and the input information satisfying the condition may be information indicating existence of an approaching object. When an approaching object is detected, the second content may be displayed, where the displayed second content may be content related to the first content displayed at the time when the information indicating existence of the approaching object is detected. In some embodiments, the displayed second content may be content related to the approaching object, or a preset content.

Taking a digital frame as an example. The candidate content may be displayed in the form of a screen saver in the lock screen state. When the information that an object is approaching the digital frame is detected while the digital frame is displaying a first photo, content related to the first photo may be acquired and displayed.

Taking a computer as an example. The candidate content, such as work-related content, may be displayed in a standby state. When the information that an object is approaching the computer is detected, a preset content may be acquired, which may be not work-related.

Taking a mobile phone as an example. The candidate content, such as photos, may be displayed in the form of a screen saver in the lock screen state. When the information that an object is approaching the mobile phone is detected, the identity of the approaching object may be acquired, and photos related to the approaching object, tags, or pre-entered texts for the approaching object may be displayed based on the identity of the approaching object. As such, the interaction between the user and the approaching object may be improved.

In some embodiments, when the first content and the second content are displayed in the form of a screen saver in a permission-restricted state, the input information satisfying the condition may be information indicating there is no approaching object. As such, the second content may be displayed when the input information is information indicating there is no approaching object. When the input information is information indicating there is an approaching object, other contents, such as the first content, may be displayed.

In some embodiments, if no content is being displayed is the first content and the acquired input information satisfies the condition, the second content may be displayed, where the input information satisfying the condition may be information of the presence of an approaching object. As such, when the presence of an approaching object is detected, the black screen state may be switched to a state where the second content is being displayed. In particular, the displayed second content may be content related to the approaching object, or a preset content.

In this case, the electronic device may first switch from the black screen state to a bright screen state, then the second content may be displayed, where in the bright screen state the preset display content may be displayed. In some embodiments, detection may be performed in the black screen state and the second content may be determined, such that the black screen state may be directly switched to a state where the second content is being displayed.

In some embodiments, the input information may be information indicating whether a viewer is present. That is, the presence of a viewer may be determined by using the input information. The input information satisfying the condition may be the presence of a viewer or the absence of a viewer. More specifically, the presence of a viewer may be determined by using face recognition and/or sight recognition.

For example, when a frontal image of a person's face is detected through a camera, it may indicate that a viewer is looking in the direction of the electronic device. As such, the presence of a viewer may be determined.

In some embodiments, the input information may be information indicating whether a viewer is present, and the information may be determined by determining whether a viewer is viewing the electronic device or the first content displayed by the electronic device. The input information satisfying the condition may be the presence of a viewer viewing the electronic device or the first content displayed by the electronic device, or the absence of a viewer viewing the electronic device or the first content displayed by the electronic device. That is, by determining whether there is a viewer of interest. A viewer may be considered to be present if there is a viewer of interest.

For example, if it is determined that a viewer is currently viewing the first content displayed by the electronic device by using a camera, then the input information is satisfying the condition.

In some embodiments, if the input information satisfying the condition is the detection of the information of the presence of a viewer, when the first content and the second content are that the first content is displayed in the form of a screen saver in a permission-restricted state, a viewer is detected, the preset second content may be directly displayed. Or, the identity of the viewer may be determined, and the second content related to the viewer may be displayed based on the identity. Or, when a viewer is detected, the first content that the viewer pays attention to at the time the view is detected may be detected, and the second content related to the first content may be displayed. In some embodiments, when a viewer is detected, the candidate content that the viewer has paid attention to for the longest time may be determined and regarded as the first content. Subsequently, the second content related to the first content may be displayed.

In some embodiments, if the input information satisfying the condition is the detection of the information of the presence of a viewer, and the first content is that no content is being displayed, no content may be displayed in the first state. When a viewer is detected, switch from not displaying content to displaying the preset second content. In some embodiments, switch directly from not displaying content to displaying second content related to the viewer.

In some embodiments, if the input information satisfying the condition is the detection of the information of the presence of a viewer, and the first content is that no content is being displayed, no content may be displayed in the first state. When a viewer is detected, the electronic device may be directly switched from a state in which no content is being displayed to a bright screen state. Subsequently, determine whether the viewer satisfies a preset condition, such as whether the viewer is allowed to access the related content. If it is determined that the viewer satisfies the preset condition, the electronic device may directly switch from the bright screen state to displaying the preset second content. In some embodiments, the electronic device may directly switch from the bright screen state to the second content related to the viewer. If it is determined that the viewer does not satisfy the preset condition, the electronic device may switch from the bright screen state to the state in which no content is being displayed. In some embodiments, after the bright screen state reaches a preset duration, the electronic device may directly switch to the state in which no content is being displayed.

In the processing method provided in the embodiments of the present disclosure, the first content can be displayed in the first state, and the input information can be acquired. If the input information satisfies a condition, the second content can be displayed. In some embodiments, the input information satisfying the condition may include the presence of a viewer of interest. In the technical solution provided in the embodiments of the present disclosure, the first content can be displayed in the first state, and the second content can be displayed after determining that a viewer of interest is present, thereby realizing a solution for determining the display content based on the presence of a viewer and improving the user experience.

The embodiments of the disclosure are described herein in a progressive manner, with the emphasis of each of the embodiments on the difference between it and the other embodiments; hence, for the same or similar parts between the embodiments, one can refer to the other embodiments. For the device disclosed in the embodiments, the description thereof is simple since they correspond to the methods disclosed in the embodiments, hence, the related parts can refer to the description of the method parts.

As will be appreciated by those of ordinary skill in the art, the embodiments disclosed herein can be implemented by way of electronic hardware, computer software, or a combination of the two. To clearly illustrate the interchangeability between hardware and software, components and steps of respective examples have already been described in a general way in terms of functions in the above description. These functions are to be executed by hardware manner or software manner depending upon the particular application of the technique process and design constraints. Those skilled in the art can use different methods to achieve the described functions with respect to each specific application, but such implementation should not be construed as going beyond the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Those skilled in the art can implement or use the disclosure by the above description of the embodiments herein. Various modifications to these embodiments will be apparent to those skilled in the art, and the general principle defined herein can be implemented in other embodiments without deviation from the spirit or scope of the disclosure. Therefore, the disclosure will not be limited to these embodiments described herein, but in accordance with the widest scope consistent with the principle and novel features disclosed herein.

What is claimed is:

1. A processing method comprising:
    displaying a first content related to a subject matter at a first permission state, the first content is a part of a candidate content that an electronic device is configured by a user to display;
    determining the subject matter based on the first content;
    finding and identifying a second content based on the determined subject matter, and the second content is different from the first content;
    detecting, by the electronic device, presence of a viewer of interest based on face recognition and/or sight recognition indicating a sight with the presence of the viewer, by the electronic device;
    acquiring, by the electronic device, input information satisfying a condition indicating the presence of the viewer of interest interested in at least part of the candidate content; and
    displaying the second content in response to receiving the input information at a second permission state, at the electronic device, wherein
    the candidate content that the viewer has paid attention to for the longest time may be regarded as the first content, and the second permission state allows for more access to operation of the electronic device than the first permission state.

2. The method of claim 1, wherein displaying the second content includes:
    determining a related content based on the first content; and
    displaying the related content as the second content.

3. The method of claim 1, wherein:
    the second content is a video content; and
    the first content is an image content that is a part of the video content.

4. The method of claim 1, wherein displaying the first content includes:
    displaying a plurality of image contents including the first content in sequence, the plurality of image contents include at least one of non-adjacent parts of a same video content or parts from different video contents.

5. The method of claim 4, further comprising, before displaying the plurality of image contents:
    processing the same video content or the different video contents to generate the plurality of image contents.

6. The method of claim 1, further comprising:
    acquiring object information corresponding to the input information; and
    determining a third content related to the object information, the third content being same as or different from the second content.

7. The method of claim 6, wherein:
    acquiring the object information includes:
        acquiring an image related to the input information; and
        performing identity identification on the image to determine the object information of the input information; and
    determining the third content related to the object information includes matching the object information in a candidate content to determine the third content related to the object information, the candidate content corresponding to one or more pieces of object information.

8. The method of claim 1, wherein:
    displaying the first content includes displaying the first content in a first state of an electronic device; and
    the electronic device has a second state different from the first state.

9. The method of claim 8, wherein:
    the first state has a first permission, the second state has a second permission, and the first permission is lower than the second permission;
    the second state allows a function different from a candidate content output function; and the first content and the second content are output results of the candidate content output function.

10. The method of claim 8, wherein:
the first state is a state in which no content is being displayed;
acquiring the input information includes acquiring an input for triggering a content display; and
displaying the second content includes:
determining the second content using object information of the viewer acquired before content displaying; and
displaying the determined second content.

11. The method of claim 1, wherein the input information includes at least one of:
information indicating that a movement of the electronic device satisfies the condition;
information indicating whether an approaching object is present; or
information indicating whether the viewer is present.

12. An electronic device comprising:
a display device configured to display a first content related to a subject matter at a first permission state, the first content is a part of a candidate content that the electronic device is configured to display by a user;
a sensor configured to acquire input information satisfying a condition indicating a presence of a viewer of interest interested in at least part of the candidate content; and
a processor configured to:
control the display device;
determine the subject matter based on the first content;
find and identify a second content based on the determined subject matter, and the second content is different from the first content;
detect presence of the viewer of interest based on face recognition and/or sight recognition indicating a sight with the presence of the viewer; and
display a second content in response to receiving the input information at a second permission state, wherein
the candidate content that the viewer has paid attention to for the longest time may be regarded as the first content, and the second permission state allows for more access to operation of the electronic device than the first permission state.

13. The electronic device of claim 12, wherein the processor is further configured to:
determine a related content based on the first content; and
control the display device to display the related content as the second content.

14. The electronic device of claim 12, wherein:
the second content is a video content; and
the first content is an image content that is a part of the video content.

15. The electronic device of claim 12, wherein the processing device is further configured to control the display device to display a plurality of image contents including the first content in sequence, the plurality of image contents include at least one of non-adjacent parts of a same video content or parts from different video contents.

16. The electronic device of claim 15, wherein the processing device is further configured to, before controlling the display device to display the plurality of image contents, process the same video content or the different video contents to generate the plurality of image contents.

17. The electronic device of claim 12, wherein the processing device is further configured to:
acquire object information corresponding to the input information; and
determine a third content related to the object information, the third content being same as or different from the second content.

18. The electronic device of claim 17, wherein the processing device is further configured to:
acquire an image related to the input information;
perform identity identification on the image to determine the object information of the input information; and
match the object information in a candidate content to determine the third content related to the object information, the candidate content corresponding to one or more pieces of object information.

* * * * *